Aug. 2, 1960   N. J. SLUTZKY   2,947,506
ADJUSTABLE SUPPORT
Filed June 14, 1954   2 Sheets-Sheet 1
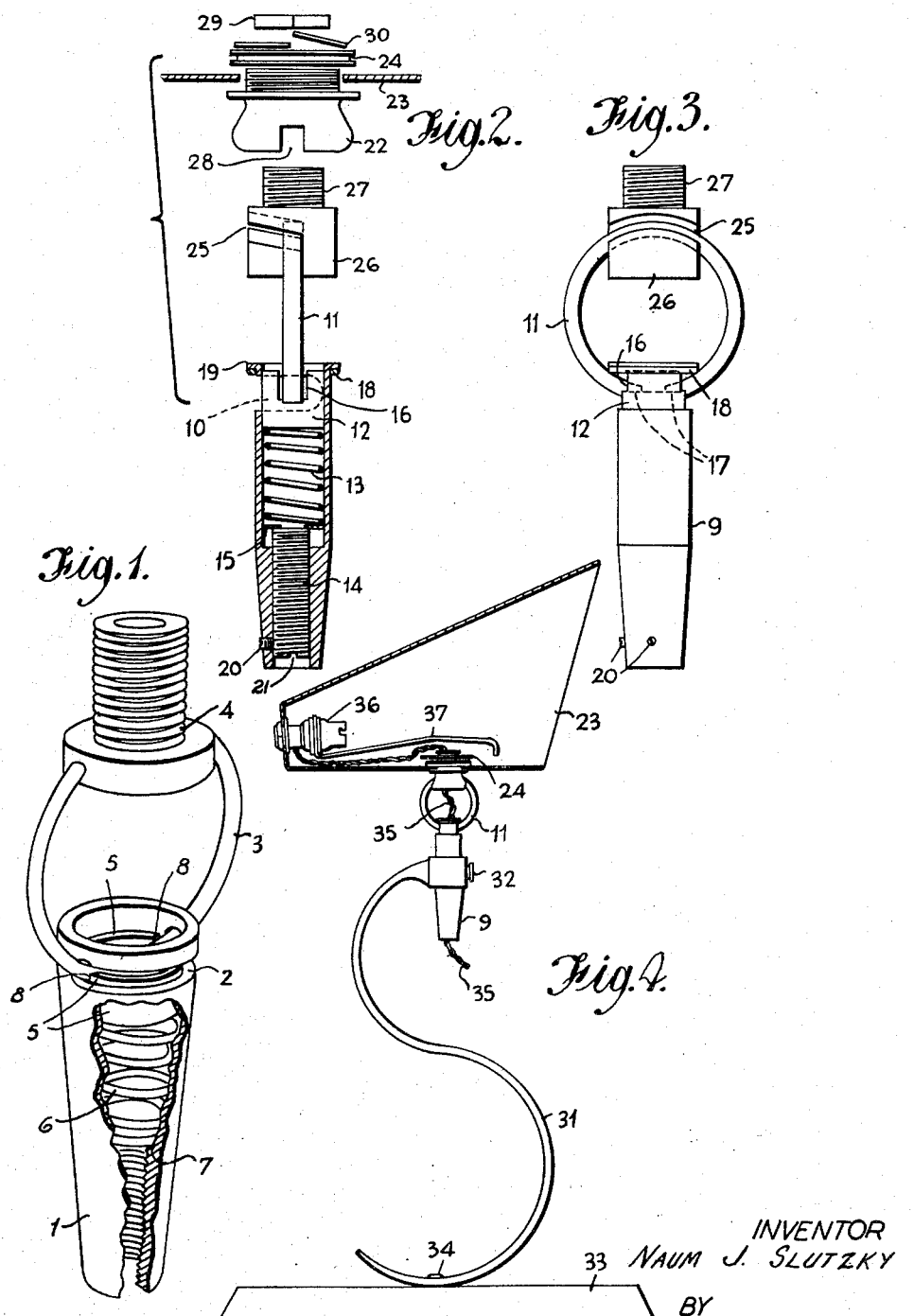
INVENTOR
NAUM J. SLUTZKY
BY
Holcombe, Wetherill & Brisebois
ATTORNEYS

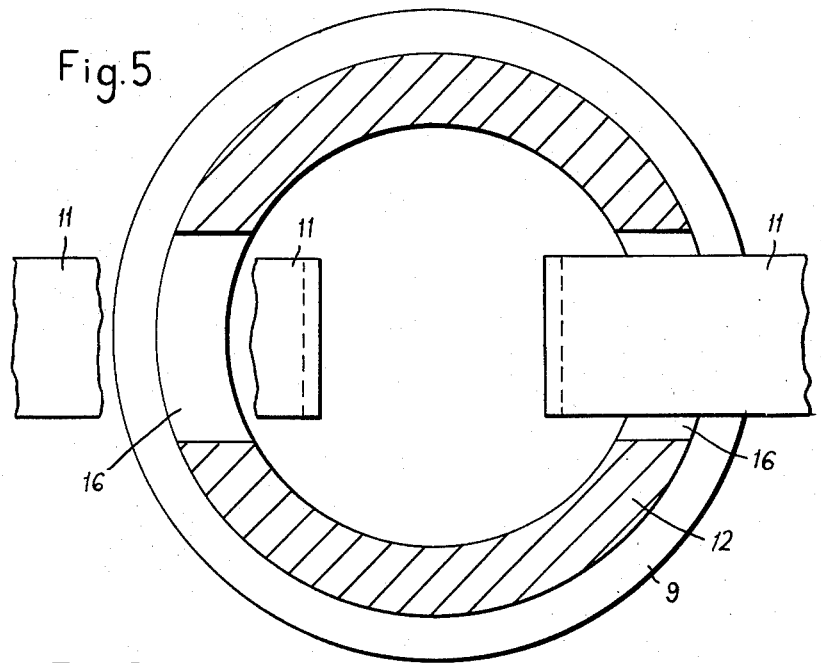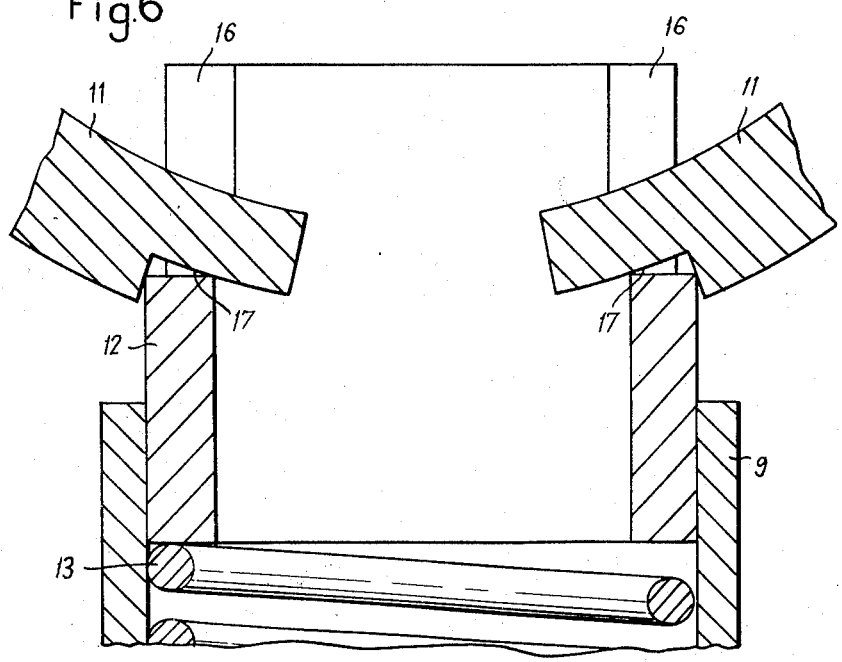

United States Patent Office 2,947,506
Patented Aug. 2, 1960

2,947,506

ADJUSTABLE SUPPORT

Naum Julius Slutzky, 92 Newlands Park, London, England

Filed June 14, 1954, Ser. No. 436,654

Claims priority, application Great Britain June 12, 1953

6 Claims. (Cl. 248—122)

The present invention relates to an adjustable support primarily intended for mounting an object such as an electric lamp holder in an adjustable manner with respect to a stand or other support member. The device according to the invention is however applicable to supporting devices or instruments other than lamp holders in an adjustable manner.

One object of the present invention is to provide means whereby a lamp holder or other device to be supported can be carried by a ring member which is passed through a transverse opening, or two or more aligned openings, adjacent the end of a support member, whereby the ring may be slid through said transverse opening or openings to adjust the position of the holder relative to the support member, there being sufficient friction between the ring and the support member that the ring will thereby be held in the adjusted position.

Another object of the invention is to ensure that the ring may be swung around the transverse opening or openings in addition to being slidable therethrough, whereby substantially universal adjustment of the lamp holder or the like may be obtained.

Yet another object of the invention is to provide means for adjustably supporting an object on a stand or similar support on a ring member which is resiliently clamped in relation to a boss or similar projection on the object to be supported so as to be gripped thereby but be capable of sliding therethrough, the said ring also being passed through a transverse opening, or two or more aligned openings, adjacent the end of a support member, there being sufficient friction between the ring and the support member that the ring will thereby be held in the adjusted position, whereby the ring may be swung around the transverse opening or openings thus to obtain substantially universal adjustment of the object with respect to the stand or similar support.

In order that the invention may be more readily understood, reference will now be made to the accompanying drawings which show two different embodiments thereof by way of example, and in which—

Figure 1 shows a cut-away perspective view of a first embodiment according to the invention.

Figure 2 shows a section through another form of the invention.

Figure 3 shows an outside view of the device of Figure 2 rotated through 90° but omitting the lamp-shade boss.

Figure 4 shows one way in which the support member of Figures 2 and 3 may be used in conjunction with a table lamp standard.

Figure 5 shows a transverse cross-sectional view through the plug and immediately adjacent parts to a greatly enlarged scale, a portion of the ring member being shown in plan view, and Figure 6 shows a longitudinal cross-sectional view through the plug and immediately adjacent parts also to a greatly enlarged scale.

In Figure 1 there is shown a tubular support member 1 which may be a fitting for attachment to an electric light bracket or may itself constitute the arm or standard of an electric light fitting, such as a table lamp. The end of the tubular support member 1 is formed with a transverse slot 2 extending slightly more than half way across the diameter of the tube. The width of the slot 2 is made slightly greater than the gauge of a metal wire which is bent into a circular ring 3, there being secured between the two ends of the ring a threaded tubular nipple 4 adapted to receive the screw thread of the standard electric lamp holder.

Arranged within the tubular support 1 is a tubular plug 5 which is spring-pressed outwardly by means of a helical spring 6 arranged between the inner end of the plug 5 and a shoulder 7 on the internal diameter of the tubular support 1. The outer end of the plug is formed with diametrically opposed notches 8. By depressing the plug 5 against the action of the spring 6 so that the outer end of the plug is below the transverse slot 2, the ring 3 may be inserted into the slot. The plug is then allowed to move outwardly and retains the ring 3 in position by the ring fitting into the diametrically opposed notches 8 at the end of the plug. The spring acting on the plug urges it into frictional contact with the ring.

With the arrangement described, the electric supply cord may extend through the tubular support 1 and the tubular nipple 4 into the lamp holder. The lamp holder can both be rocked about that part of the ring which extends through the support member, and the ring may also be slid circumferentially through the support member to effect adjustment in another direction. The arrangement thus enables wide adjustment of the lamp holder to be achieved, and possesses the advantage that, since the ring cannot be turned about the axis of the support member 1, there is less risk of damage to the electric supply cord than when using universal supports of the ball and socket type.

In Figures 2 to 6, the tubular support is shown at 9 and is formed with a transverse slot 10 extending slightly more than half way across the diameter of the support. The width of the slot 10 is substantially greater than the gauge of the ring member 11 which is made from metal, preferably hardened steel, and which is of rectangular cross-section formed into a circular shape, with a small section removed from its circumference. The ends left by removal of this section are notched at 17.

Arranged within the tubular support 9 is a tubular plug 12 which is made from metal, preferably hardened steel and is spring-pressed outwardly by means of a helical spring 13 arranged between the inner end of the plug 12 and a screwed stem 14 screwed into the tubular support 9. Between the end of the screwed stem 14 and the end of the spring 13 there is provided a washer 15 to take the thrust of the spring. The outer end of the plug 12 is provided with diametrically opposed notches 16. The ring 11 is inserted into the tubular support by unscrewing the stem 14 to allow the spring 13 and plug 12 to drop down clear of the slot 10 whereupon the notched ends of the ring can be passed through the slot 10 and over the top of plug 12 so that in this position, with the plug 12 clear of slot 10, the ring 11 can slide through the slot. The position of ring 11 is then adjusted so that notches 17 thereof rest on the notches 16 in the plug and the screwed stem 14 is then screwed into the support member 9 still with the notches 17 of the ends of the ring 11 resting upon the notches 16 of the plug 12. When the screwed stem 14 is screwed home, the ring bears against a hardened steel washer 18 provided at the upper end of the tubular member 9 abutting against a shoulder 19 thereof. The spring 13 acts on the plug 12 to urge it in frictional contact with the ring.

In order to lock the screwed stem 14 into position, two set screws 20 are provided which pass through the tubular member 9 and lock into the threads of the stem 14. The screwed stem 14 is provided with a screwdriver slot 21 to assist in adjusting its longitudinal position with respect to the tubular support 9.

The ring 11 may be adjusted into any angular relationship with respect to the tubular support 9 by simply pushing its upper part away from its vertical position, to the right or left of Fig. 2, and remains in an adjusted position owing to the friction between the ring and plug and between the ring and washer 18 resulting from pressure imposed upon the shutter by the spring 13. The ring may also be turned through a small arc about the axis of the support, since the shutter will turn with it, but is prevented from making a complete rotation by coming up against the end of the slot 10. To remove ring 11 for any reason, the screwed stem 14 is slackened to drop the spring 13 and plug 12 whereupon ring 11 can be slipped out through slot 10.

The ring is attached to a device to be supported for example, a lamp-shade, by associating it with a bored boss 22 secured to the lamp-shade 23 by a suitable nut 24. The ring is passed through a slot 25 in a nipple 26 having a screw thread 27 and the ring and nipple are passed through the bore in the boss 22, said bore being of adequate diameter for this purpose, the ring locating in the slot 28 of the boss. The screw threads 27 project right through the boss and nut 24 to enable the nipple to be fixed in position with relation to the boss by means of the nut 29 which is screwed on to the projecting threads 27. A spring washer 30 is interposed between the nut 29 and the nut 24 so that the ring is resiliently held in the boss 22 but, nevertheless, it is free to slide through the slots 25 and 28 whereby the lamp-shade 23 is widely adjustable with respect to the support member 9.

Figure 4 shows the support member 9, ring 11 and lamp-shade 23 secured in relation to a stand 31, which latter is secured to the support member by means of the clamping screw 32, the whole being secured to a base 33, for example, by means of a screw 34.

The electrical supply cord 35 passes through the tubular member and nut 29 for connection to the bayonet socket 36 within the lamp-shade and a strip of metal, for example, is secured to the socket 36 so as to lie over the leads 35 and protect them from the heat of the lamp when in use. The other end of the leads may project through the lower end of the tubular member 9 for connection to the mains or, if desired, the support 31 may be hollow and a suitable aperture provided in the tubular support member 9 to allow the leads to pass through the support 31, to emerge from a convenient exit point.

It will be apparent that the support member need not necessarily be associated with a table lamp stand of the kind shown in Figure 4 but may be associated in any desired manner with any other form of support.

I claim:

1. An adjustable support device comprising a hollow tubular support member having a transverse opening adjacent one end thereof, a ring member located in said transverse opening, a tubular plug located within said hollow tubular support, stop means at the other end of said support, and a spring between said stop means and one end of said tubular plug, said spring being mounted to push said tubular plug and apply its other end against said ring whereby said ring is frictionally held in said opening but can slide therethrough when said plug is moved clear of said opening.

2. An adjustable support device comprising a boss, a ring member resiliently clamped to said boss for sliding in relation thereto, a hollow tubular support member having a transverse opening adjacent one end thereof, said ring member also being located in said transverse opening, a tubular plug located within said hollow tubular support, stop means at the other end of said support, and a spring between said stop means and one end of said tubular plug, said spring being mounted to push said tubular plug and apply its other end against said ring whereby said ring is frictionally held in said opening but can slide therethrough when said plug is moved clear of said opening.

3. A device as claimed in claim 2 in which said transverse opening consists of a slot made in one side of said hollow tubular support member, said slot being at least partially closable by said plug.

4. A device as claimed in claim 3 and further comprising a stand having a base member and means for securing said hollow tubular support member to said stand.

5. An adjustable support device comprising a boss, a ring member having a small portion cut out from its circumference resiliently clamped to said boss at a part substantially diametrically opposite said cut out portion for sliding in relation to said boss, a hollow tubular support member having a transverse opening adjacent one end thereof, the ends of said cut out portion of said ring being located in said transverse opening, notches at the ends of said cut out portion, a tubular plug located within said hollow tubular support, stop means at the other end of said support, and a spring between said stop means and one end of said tubular plug, said spring being mounted to push said tubular plug and apply its other end against said notches whereby said ring member is swingable about said transverse opening but is frictionally held in said opening by the pressure of said spring.

6. A device as claimed in claim 5 and further comprising a stand having a base member and means securing said hollow tubular support member to said stand.

References Cited in the file of this patent

UNITED STATES PATENTS

| 293,897 | Marqua | Feb. 19, 1884 |
| 354,469 | Gould | Dec. 14, 1886 |
| 585,518 | Hamm et al. | June 29, 1897 |
| 1,031,839 | Cochran | July 9, 1912 |
| 1,365,093 | D'Aruy | Jan. 11, 1921 |
| 1,823,619 | Mangin | Sept. 15, 1931 |
| 1,965,668 | Ringwald | July 10, 1934 |
| 2,647,896 | Kernodle | Aug. 4, 1953 |

UNITED STATES PATENTS

| 15,331 | Great Britain | 1914 |
| 60,277 | Denmark | Oct. 26, 1942 |
| 490,736 | Canada | Feb. 24, 1953 |
| 643,749 | Germany | Aug. 28, 1937 |
| 937,365 | France | Mar. 8, 1948 |